US009417891B2

(12) United States Patent
Beveridge

(10) Patent No.: US 9,417,891 B2
(45) Date of Patent: Aug. 16, 2016

(54) UNIFIED STORAGE/VDI PROVISIONING METHODOLOGY

(75) Inventor: Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 13/493,939

(22) Filed: Jun. 11, 2012

(65) Prior Publication Data

US 2013/0332610 A1  Dec. 12, 2013

(51) Int. Cl.
*G06F 9/44* (2006.01)
*G06F 9/455* (2006.01)

(52) U.S. Cl.
CPC .......... *G06F 9/4445* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 4,916,608 | A * | 4/1990 | Shultz | 718/104 |
| 7,730,486 | B2 * | 6/2010 | Herington | 718/1 |
| 7,818,515 | B1 * | 10/2010 | Umbehocker et al. | 711/154 |
| 7,951,470 | B2 | 5/2011 | Tokuda et al. | |
| 8,230,069 | B2 * | 7/2012 | Korupolu | 709/226 |
| 8,464,267 | B2 * | 6/2013 | Uyeda et al. | 718/105 |
| 8,560,671 | B1 * | 10/2013 | Yahalom et al. | 709/224 |
| 8,589,921 | B2 * | 11/2013 | Heim | 718/1 |
| 8,959,293 | B2 * | 2/2015 | Kalach et al. | 711/154 |
| 2003/0120676 | A1 * | 6/2003 | Holavanahalli et al. | 707/102 |
| 2009/0037680 | A1 | 2/2009 | Colbert et al. | |
| 2010/0070978 | A1 * | 3/2010 | Chawla et al. | 718/105 |
| 2010/0211956 | A1 * | 8/2010 | Gopisetty | G06F 9/5088 718/104 |
| 2011/0246984 | A1 * | 10/2011 | Sharp et al. | 718/1 |
| 2011/0251992 | A1 * | 10/2011 | Bethlehem et al. | 707/610 |
| 2012/0151163 | A1 * | 6/2012 | Ripberger | G06F 11/2071 711/162 |
| 2012/0173778 | A1 * | 7/2012 | Povaliaev et al. | 710/68 |
| 2013/0198742 | A1 * | 8/2013 | Kumar et al. | 718/1 |
| 2013/0263120 | A1 * | 10/2013 | Patil | G06F 9/45558 718/1 |
| 2013/0282672 | A1 * | 10/2013 | Tashiro et al. | 707/692 |
| 2013/0290955 | A1 * | 10/2013 | Turner | H04L 41/12 718/1 |
| 2013/0304899 | A1 * | 11/2013 | Winkler | H04L 67/34 709/224 |

FOREIGN PATENT DOCUMENTS

WO    2008141900 A1    11/2008

OTHER PUBLICATIONS

Meyer, Dutch T., et al. "Parallax: virtual disks for virtual machines." ACM SIGOPS Operating Systems Review. vol. 42. No. 4. ACM, 2008.*

(Continued)

*Primary Examiner* — Scott B Christensen
*Assistant Examiner* — Sean Concannon

(57) ABSTRACT

Methods, computer-readable storage medium, and systems described herein facilitate provisioning a virtual desktop infrastructure having virtual shared storage. A provisioning manager receives a desktop pool type and provisions virtual shared storage among a cluster of hosts. The provisioning manager configures the virtual shared storage based on the desktop pool type and provisions at least one virtual machine to each host in the cluster of hosts. The provisioning manager optimizes the virtual shared storage by receiving a storage performance benchmark from each host and performing an optimization on the cluster of hosts if the storage performance benchmark results do not meet a threshold within a predefined tolerance.

20 Claims, 2 Drawing Sheets

(56) References Cited

OTHER PUBLICATIONS

Nurmi, Daniel, et al. "The Eucalyptus Open-Source Cloud-Computing System." Cluster Computing and the Grid, 2009. CCGRID'09. 9th IEEE/ACM International Symposium on. IEEE, 2009.*
Gallagher, Simon (Dec. 4, 2009) "Comparing the I/O Performance of 2 or more Virtual Machines SSD, SATA & IOmeter." Retrieved from https://web.archive.org/...://vinf.net/2009/11/19/comparing-the-io-performance-of-2-or-more-virtual-machines-ssd-sata-iometer[Jul. 25, 2014 7:49:44 AM].*

VMware vSphere Storage Appliance, Copyright 2012 VMware, Inc., pp. 1-3.
Daniel Beveridge, Accelerate VDI-VSA Based I/O Designs, pp. 1-13.
International Search Report and Written Opinion for Application No. PCT/US2013/044465 dated Sep. 13, 2013, 10 pages.
Edwards et al., "High-speed Storage Nodes for the Cloud", 2011 Fourth IEEE International Conference on Utility and Cloud Computing, pp. 25-32.

* cited by examiner

UNIFIED STORAGE/VDI PROVISIONING METHODOLOGY

BACKGROUND

Virtual Desktop Infrastructure (VDI) refers to a system of providing complete centrally-managed desktops to users using computer virtualization technology. VDI is used to create a large number of independent computing environments for a large number of users. The desktop users may be grouped together based on similar software and computing needs. The desktops themselves are correspondingly grouped together in "desktop pools" that may be provisioned, managed, and deleted as single entities. In VDI, each desktop is exported to the user from a virtual machine (VM) that is assigned to the user. The desktop pools are associated with resources in the datacenter, including, but not limited to, compute resources, memory, network, and storage.

Storage in the datacenter is sometimes shared among desktop pools. Known shared storage may be provided by storage area network (SAN), network-attached storage (NAS), and other similar systems. Known shared storage systems inherently add latency to storage operations due to the storage system being remote from the computer systems, or "hosts", that host the virtual machines associated with the desktop pool. An alternative to known shared storage systems is virtual shared storage, which uses the local storage of each host in a cluster to create an abstract storage layer. The local storage provides reduced latencies and the abstract storage layer provides benefits similar to those provided by traditional shared storage.

Virtual shared storage eliminates the need for traditional shared storage, but requires that each host in a cluster be individually administered to provision and configure the virtual shared storage. Moreover, configuring each host for improved virtual shared storage performance presents an optimization problem that is both time-consuming and burdensome due to the time required to measure performance of a cluster and the work required to separately configure each host. Accordingly, there is a need for an automated system and method for provisioning a VDI for use with virtual shared storage.

SUMMARY

Methods, computer-readable storage medium, and systems described herein facilitate provisioning a virtual desktop infrastructure having virtual shared storage. A provisioning manager provisions virtual shared storage among a cluster of hosts. The provisioning manager provisions virtual storage resources on each host in the cluster of hosts. The provisioning manager may deploy a virtual storage appliance (VSA) or other hypervisor-based cluster storage functionality. The provisioning manager optimizes the virtual shared storage by receiving a storage performance benchmark from each host and performing an optimization on the cluster of hosts if the storage performance benchmark results do not meet a predefined threshold.

DETAILED DESCRIPTION

Figure 1:
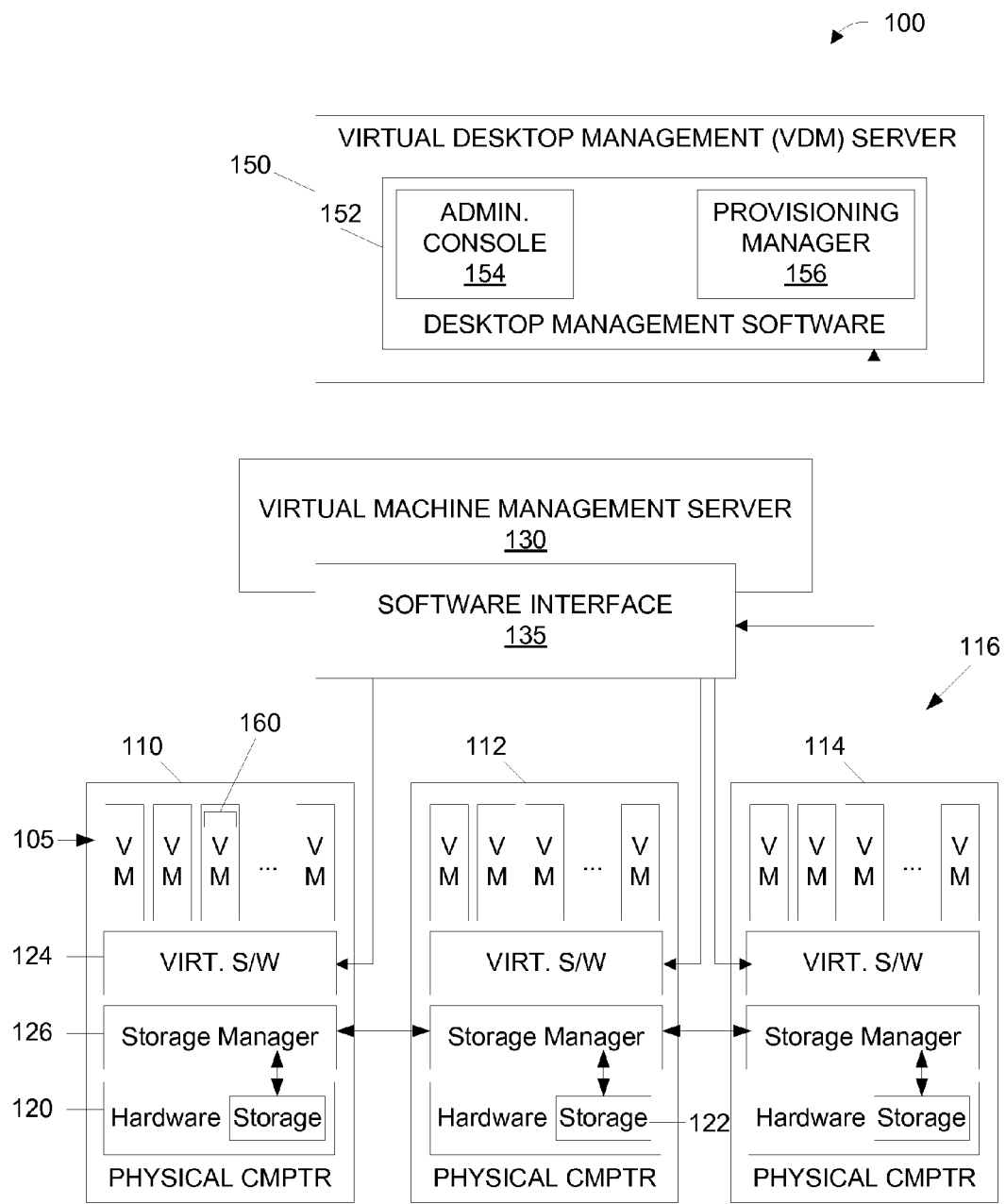
FIG. 1 is a block diagram of an exemplary virtual desktop infrastructure (VDI) having virtual shared storage.

FIG. 1 is an exemplary virtual desktop infrastructure (VDI) 100 having virtual shared storage and a plurality of virtual machines (VMs) 105 on physical computer systems, or hosts, 110, 112, and 114, collectively known as a cluster 116. Each VM 105 provides a "desktop" (not shown) to a user of the VMs 105. The desktop is an interactive user environment provided by a guest operating system and applications running within the VM, and generally includes a graphical display, but may include other outputs, such as audio, indicator lamps, tactile feedback, etc. The desktop also accepts input from the user in the form of device inputs, such as keyboard and mouse inputs. In addition to user input/output, the desktop may send and receive device data, such as input/output for a FLASH memory device local to the remote user, or to a local printer.

Each physical computer 110, 112, and 114, includes a hardware 120, a virtualization software, or manager, 124 running on hardware 120, and one or more VMs 105 executing on hardware 120 by way of virtualization software 124. Virtualization software 124 is therefore logically interposed between, and interfaces with, hardware 120 and VMs 105. Virtualization software 124 may be implemented directly in hardware, e.g., as a system-on-a-chip, firmware, FPGA, etc. Hardware 120 includes at least one processor (not shown), wherein each processor is an execution unit, or "core," on a microprocessor chip. Hardware 120 also includes system memory (not shown), which is general volatile random access memory (RAM), a network interface port (NIC), a storage system 122, and other devices. Storage system 122 may include one or more non-volatile storage devices (not shown), such as hard disk drives, solid state drives (SSD), and the like. Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each VM 105. Each VM is an abstraction of a physical computer system and may include an operating system (OS) such as Microsoft Windows® and applications, which are referred to as the "guest OS" and "guest applications," respectively, wherein the term "guest" indicates it is a software entity that resides within the VM. Virtualized storage devices are used to store the guest OS, guest applications, and guest files. Virtualized storage devices such as virtual disks may be backed by virtual disk image files on storage systems 122 within one or more datastores, as described in U.S. Patent Application Publication No. 2010/0070978 to Chawla et al., which is hereby incorporated by reference in its entirety.

Each physical computer 110, 112, and 114 includes a storage manager 126 that manages each respective storage system 122. Storage manager 126 is configured to provide a storage layer abstraction that includes virtual, or logical, shared storage using storage systems 122. At least one datastore may be provided by the storage layer abstraction such that virtual disk image files may be stored within the virtual shared storage.

Shared storage accessible by physical computers 110, 112, and 114 enables virtualization software 124 to provide high availability features, such as the ability to restart a VM 105 when a physical computer fails. Using shared storage, VMs 105 can be migrated from one physical computer to another. As shared storage is typically provided by a storage area network (SAN), network-attached storage (NAS), and/or both, virtual disk images are typically stored remotely from the physical computer on which the corresponding VM is executing. The result is latencies much higher than latencies for storage systems 122. Virtual shared storage combines the added features of shared storage while using storage systems 122 for reduced latencies. Virtual disk images may be stored locally with respect to the physical computer on which the corresponding VM 105 is executing. Virtual disk images, or portions thereof, may be replicated to other areas of the virtual shared storage that are stored on other physical computers, thereby providing data redundancy. As storage manager 126 abstracts the virtual shared storage, virtualization software 124 may interact with virtual shared storage as if it were non-virtual shared storage.

For example, storage manager 126 may be implemented as a virtual storage appliance (VSA). The VSA is software that runs within a VM 105 on each physical computer 110, 112, and 114 to create a storage cluster. The VSA provides virtual shared storage by interfacing directly with storage systems 122 on each respective physical computer 110, 112, and 114, and providing a logical file system that is locally hosted and replicated among storage systems 122 within the storage cluster.

As another example, storage manager 126 may be implemented as a virtual storage area network (VSAN) by virtualization software 124. More particularly, storage manager 126 may consolidate one or more storage systems 122 to create a VSAN interface, e.g., iSCSI, accessible by virtualization software 124. One or more datastores may be stored on one or more logical disks, i.e., LUNs, on the VSAN.

Virtual Machine Management Server (VMMS) 130 provides a software interface 135 that, among other things, allows other programs to control the lifecycle of VMs 105 running on physical computers 110, 112, 114, that are managed by VMMS 130. VMMS 130 may provide other VM management and manipulations than those specifically mentioned here.

Virtual Desktop Management Server (VDMS) 150 may be a physical computer system or a virtual machine that runs desktop management software 152. An exemplary VDMS is described in U.S. patent application Ser. No. 11/395,012, filed Mar. 31, 2006 by Puneet Chawla, et al. Desktop management software 152 manages pools of computer resources to run VMs 105 on a cluster or set of clusters typically containing multiple servers with CPUs, memory, and communications hardware (network). In the embodiment shown in FIG. 1, desktop management software 152 includes a number of modules, including an administrative console 154, and a provisioning manager 156.

Desktop management software 152 interfaces with VMMS 130 using software interface 135 to control VMs 105. For example, VMMS 130 may allow desktop management software 152 to: (a) discover computer, storage, and network resources; (b) create logical compute pools providing features like automatic CPU and memory load balancing; (c) create VMs with one or more virtual disks on local or shared storage, e.g., clones with full or sparse disks; (d) create VMs anchored to a base virtual machine (e.g., as described in U.S. Pat. No. 7,951,470, granted May 10, 2011, and entitled, "Synchronization and customization of a Clone Computer" and incorporated herein by reference); (e) monitor storage subsystems, including, but not limited to, storage consumption of individual disks, storage consumption of virtual machines as a single unit and virtual machine file system monitoring (free space, total space, etc); (f) perform power operations on virtual machines (i.e., power on, power-off, suspend, resume, checkpoint, etc.); (g) perform offline migrations of virtual disks from one datastore to another; (h) perform hot storage migration wherein VM disks are migrated during operation of the VM (e.g., as described in U.S. patent application publication No. 2009/0037680, incorporated herein by reference); and (i) provide an out of band communication channel to software programs running inside the virtual machine.

Administrative console 154 provides a remotely-accessible user interface to an administrator to manage the configuration of desktop pools. In one embodiment, a graphical user interface may be exported via hypertext transfer protocol (HTTP) and accessed by a commodity web browser. Alternatively, a command-line interface or a rich client can be provided to local or remote users. Administrative console 154 allows the administrator to perform a plurality of functions, such as: (a) create desktop pools, as described herein; (b) associate desktop pools with the VDMS; (c) associate a desktop pool with a master image; and (d) define VM state policies; etc.

Users of VMs 105 can generally be categorized in terms of their job functions, and accordingly the required applications and configurations of their desktops. For example, users in an engineering "pool" may require access to CAD/CAM software, whereas users in an accounting pool may require access to particular accounting software. It is generally useful to group user desktops together in a manner consistent with such groupings of the users, so that computers accessed by engineers, for example, are configured with software required by engineers, whereas computers accessed by accountants are configured with software accessed by accountants. In VDI system 100, for example, users may belong to a particular user pool, and their corresponding VMs 105 may be assigned to a corresponding desktop pool. A desktop pool is a logical manageable entity that includes a plurality of similarly-configured VMs. Each VM of a desktop pool may have delta disk image associated with the VM and a common "master image" (sometimes referred to as a "template") that is common to all the desktops in the pool. The master image may include installed software useful for the members of the corresponding user pool.

Desktop pools can be categorized into two broad categories: non-persistent and persistent. VMs 105 in non-persistent desktop pools are stateless, i.e., the desktop state is restored to the original state after every user session. For non-persistent desktops, any changes written to the virtual disks are lost at the end of the user session. Therefore, each time a user logs off, the desktop is restored to its original "pristine" state. If a user is assigned to a pool of non-persistent desktops, the user may be assigned to any VM 105 in the pool at the time the user logs in, since they are all identical. There are many use cases for non-persistent desktops, such as for data entry, information kiosks or process terminals, etc.

VMs 105 in persistent desktop pools are stateful, i.e., the desktop state, including the state of the files and applications therein, is maintained. For persistent desktops, any changes written to the virtual disks are preserved and are available at the next user session. There may be hybrid states, such as maintaining persistence for a period of time, but periodically reverting to the "pristine" state. In some embodiments, the desktop administrator can define how frequently, or under what conditions, the "revert to pristine state" operation should be performed.

Desktop pools have varying data storage performance requirements that are a function of the type of pool, i.e., non-persistent vs. persistent, and/or the corresponding use case, i.e., which applications are used. For example, for non-persistent pools, data corruption within the VM is not fatal because the entire state of the VM will eventually be lost. Accordingly, data writes in non-persistent pools may be immediately acknowledged, whether the data has been written to a disk or not. The data storage performance requirement of a desktop pool may be expressed in Input/Output Operations Per Second, or IOPS and/or other known metrics, such as latency, and any calculation thereof, such as an average or a standard deviation.

Provisioning manager 156 is configured to coordinate the provisioning, or creation, of virtual shared storage and the provisioning of VMs 105 on physical computers 110, 112, and 114. Provisioning manager 156 may be accessed via a web interface provided by admin console 154. Provisioning manager 156 communicates with VMMS 130, virtualization software 124, and/or storage manager 126 using application programming interfaces (APIs) and/or any suitable communication framework.

Provisioning manager 156 is generally used by an administrator to establish a VDI environment on physical computers that do not already have VMs, i.e., new physical computers. However, provisioning manager 156 may also be used to re-provision VMs onto already-configured physical computers, and/or to tune the performance of an existing VDI environment, as explained in more detail herein.

During operation, a user, i.e., an administrator indicates to provisioning manager 156, and provisioning manager 156 receives, a desktop pool type for cluster 116. The desktop pool type may be selected from among a list of pre-determined desktop pool types. Desktop pool types may be coarse-grained (e.g., non-persistent vs. persistent) or fine-grained (e.g., a persistent engineering pool, a non-persistent data entry pool, a non-persistent kiosk pool, etc.). Additional pool parameters may also be provided, such as "refresh" or "recompose" policies which dictate when machines reset to their master OS image. These policies impact how storage should be configured. For example, if the "refresh at logoff" policy is selected for the pool, users never re-use a desktop and file system corruption across sessions is impossible. By contrast, "refresh every 14 days" or "recompose at power off" have different implications, allowing for possible file system corruption across sessions, and by extension dictating a more conservative data management policy on the underlying storage layer such as providing acknowledgement of data writes only after such writes are actually committed to stable media. Other pool parameters relevant to the storage layer (i.e., the virtual shared storage) include whether or not an image manager and/or storage optimizer, such as View Composer from VMware, Inc., will be used as the basis for the pool. View Composer, for example, creates clones of a master Virtual Machine OS image. Each clone is a delta file which grows over time based on "copy on write" operations against the master image. Such clone files tend to have poor de-duplication ratios on underlying storage systems capable of de-duplication. As a result, de-duplication should not be enabled on the VSA or virtual storage system should the pool be based on View Composer clones. By contrast, use of "full clones" creates complete copies of the master OS image for each member of the pool. Underlying storage systems can find many common blocks in such a pool and consequently, de-duplication functionality should be enabled in the underlying virtual storage system. If the virtual storage system offers in-line compression, it should be enabled for pools which use local storage resources but in the event the hypervisor host has many attached disk drives or storage manager 126 is mounting LUNS from a central storage array, the administrator may elect to disable such compression to reduce CPU overhead, given the availability of sufficient disk bandwidth. For persistent pools, various redundancy levels may be needed. Such redundancy may be optionally configured on the virtual storage layer to assist in providing needed resilience in the event of disk failure. All of these pool parameters are relevant to the proper and optimal configuration of the virtual storage layer.

Provisioning manager 156 establishes the virtual shared storage by deploying required software (e.g., the VSA in the case of VSA-based storage), identifying the physical computers in the cluster, and/or identifying each local storage device in each physical computer in the cluster. Establishing, or provisioning, the virtual shared storage includes installing software and components to each physical computer in cluster 116 when required.

Each virtual shared storage modality, e.g., VSA, VSAN, may be configurable using one or more settings, configuration options, variables, etc. Provisioning manager 156 configures the virtual shared storage by communicating one or more settings to the storage managers 126. The settings communicated by provisioning manager 156 are based on the selected desktop pool type. For example, provisioning manager 156 may have pool-based settings for each available desktop pool type. The pool-based settings may include configurable options for improved performance of the virtual shared storage. Accordingly, the process of providing pool-based settings to each storage manager 126 may be referred to as "tuning" the virtual shared storage.

In addition, the settings may be based on configurations of storage system 122. In some embodiments, storage system 122 may include both SSD and hard drive devices. In such embodiments, storage system 122 may be optimized to use the SSD for frequently-accessed data and the hard drive may be used for less frequently-accessed data.

After the virtual shared storage is tuned for the selected pool type, provisioning manager 156 exposes the virtual shared storage to the virtualization software 124 on each physical computer in cluster 116. Exposing the virtual shared storage may include attaching block devices and/or mounting file systems. After provisioning manager 156 has established the virtual shared storage, each physical computer is able, via virtualization software 124, to read and write to the virtual shared storage. As storage manager 126 provides an abstract storage layer to virtualization software 124, virtualization software 124 may be ignorant of the underlying virtual shared storage modality being used or the configuration thereof. For example, in a VSA configuration, the ZFS file system (designed by Sun Microsystems of Santa Clara, Calif.) may be employed without knowledge of virtualization software 124.

With virtual shared storage established and tuned, provisioning manager 156 may deploy one or more VMs to each physical computer in cluster 116. The deployed VMs may be based on disk images or templates associated with each pool type. Generally, each deployed VM is substantially identical to other deployed VMs at the time of deployment, and so the process is sometimes referred to as "cloning."

While each VM 105 on a physical computer has independent virtual resources (e.g., CPU, memory, storage devices), each independent virtual resource may be dependent on a corresponding underlying physical resource. As the underlying physical resources are finite, they must be shared among the VMs. Accordingly, performance of virtual resources is related to the performance of the corresponding physical resource and the demand or usage of that physical resource by other VMs on the same physical computer. In the case of storage devices, a physical storage device, such as those in storage system 126, may be capable of a known, or determinable, number of IOPS. The net IOPS among all VMs 105 on a physical computer is equal to or less than the number of IOPS deliverable by the physical storage device unless the virtual shared storage enhances the total IOPS through caching of data, advanced coalescing of write operations, and/or other techniques. Such enhancements may be enabled by the ability to configure the VDI pool type and the virtual shared storage together as a single provisioning operation, as described herein.

If VMs 105 in the pool will have dynamic resource balancing, such as DRS (Dynamic Resource Scheduling) from VMware, Inc., enabled on the hypervisor cluster, the underlying virtual storage layer (i.e., the virtual shared storage) must be configured to ensure that each hypervisor member in a cluster can read and write to each datastore exposed by the virtual storage layer. This may require extra steps in the event of VSA storage whereby each VSA's datastore is mounted to each hypervisor host in the cluster. In this scenario, a VM may be placed on a hypervisor that is different from the hypervisor hosting the VSA to which the VM's datastore is attached. This sub-optimal placement of VMs may be corrected by provisioning manager 156 to ensure that VMs are co-located on the hypervisor which hosts the VSA to which they are attached. This process of "re-tethering" VMs must be handled by provisioning manager 156 after the virtual storage layers and the VDI pool have been initially deployed. Such re-tethering is essential to latency reduction of the I/O, and avoiding unnecessary storage traffic on the shared network components. Provisioning manager 156 may accomplish such "re-tethering" by causing VMs to move onto the hypervisor hosting the VSA storage to which they are attached, e.g., using vMotion by VMware, Inc. or other live or non-live migration techniques. This process will be an on-going process which will make such adjustments regularly even as DRS makes its own adjustments based on load leveling concerns. Re-tethering will minimize the effect DRS will have over time on the number of improperly placed VMs. Re-tethering will also minimize the number of VMs that can be impacted by a hypervisor failure without which, the fault domain could eventually expand to twice the number of machines hosted on each hypervisor. If DRS is not enabled on the VDI pool, then VMs will automatically be co-located on the correct hypervisor since in this design, only the hypervisor hosting the VM's VSA storage will have access to the datastore in question.

As the number of VMs 105 on a physical computer increases, the demand on physical resources may experience a correspondingly increased demand. In the case of storage devices, a user's experience, or an application's performance within a guest OS, may be degraded when too many VMs are operating on a physical computer. Contrariwise, a physical computer with too few VMs may be under-utilized and therefore inefficient. Determining the number of VMs 105 on a physical computer, and the configuration of the virtual shared storage, for sufficient performance and utilization is a multi-variable optimization problem.

Sufficient storage performance for a VM, or guest OS, may be defined as a minimum number of IOPS. The desktop pool type may determine the minimum number of IOPS. Alternatively, the administrator may input the minimum number of IOPS, e.g., when the desktop pool type is provided. Initially, provisioning manager 156 may use a heuristic to determine an initial number of VMs to deploy on each physical computer. Then, an optimization loop will be used to solve the optimization problem and deploy a number of VMs 105 to each physical computer based on the solution to the optimization problem.

In an exemplary implementation of VDI systems 100, provisioning manager 156 optimizes the number of deployed VMs 105 by coordinating a simultaneous benchmark of each deployed VM 105. More particularly, provisioning manager 156 communicates with an agent 160 within each VM 105 (only one agent 160 being shown in FIG. 1) after provisioning manager 156 causes each VM 105 to be powered on. Agent 160 is software executed by a guest OS and configured to respond to commands from VMMS 130 and/or VDMS 150. Agent 160 is instructed to initiate a storage performance benchmark, e.g., Iometer, made available by the Intel® Corporation of Santa Clara, Calif. Agent 160 collects benchmark result data from the storage performance benchmark software and reports the result data to provisioning manager 156. Thus, provisioning manager 156 is able to determine a maximum storage performance, i.e., maximum IOPS, of each VM when all VMs 105 on a physical computer are attempting to utilize all available storage performance.

Based on the results of the benchmark, provisioning manager 156 may perform an optimization on cluster 116. For example, provisioning manager 156 may increase or decrease the number of VMs 105 on each physical computer. Provisioning manager 156 may also alter the configuration of storage managers 126 to perform an optimization on cluster 116. For example, if storage manager 126 is a VSA, each VSA may be allocated a number of processor cores and RAM. For example, each VSA may be allocated 2 processor cores and 2 gigabytes of RAM. Based on the results of the benchmark, provisioning manager 156 may increase or decrease the number of processor cores and/or the amount of RAM.

The optimization of cluster 116 may be a multiple-iteration process generally requiring the repeated benchmarking and performance of optimizations of cluster 116 in response to benchmark results. In one embodiment, optimization is accomplished using a hill-climbing algorithm, wherein incremental adjustments are made and tested to determine an optimal solution. In another embodiment, a genetic algorithm is used to solve the optimization problem. Alternatively, any suitable algorithm may be used to determine a solution to the optimization problem.

Each benchmarking step may take hours to execute, and so optimizing cluster 116 may take one day or more. Provisioning manager 156 facilitates the efficient testing of multiple variables and configurations. For example, if the only two variables associated with a VSA are number of processor cores (2, 4, 6) and amount of RAM (2 GB, 4 GB, 8 GB, 16 GB), a possible 12 combinations of processor core and amount of RAM exist. Provisioning manager 156 automates the testing of each combination.

While provisioning manager 156 is described as operating on a cluster of physical computers without already-deployed VMs, it should be appreciated that provisioning manager 156 may operate on already-deployed VMs to optimize an existing system. Further, provisioning manager 156 may receive virtual shared storage configuration changes and transmit those changes to each storage manager 126.

Figure 2:
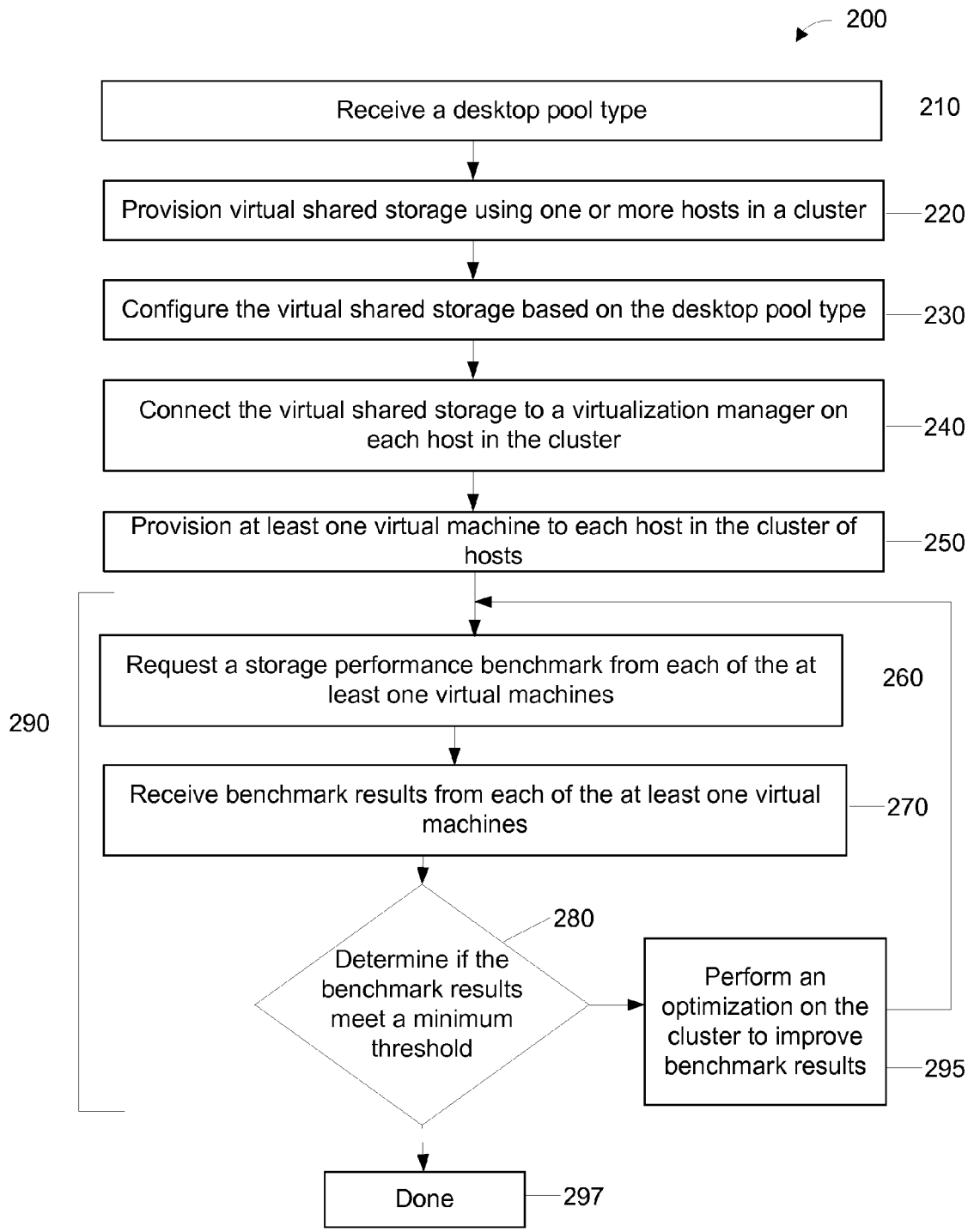
FIG. 2 is a flowchart of an exemplary method for deploying virtual machines to the VDI in FIG. 1.

FIG. 2 is a flowchart of an exemplary method 200 of deploying and optimizing VMs in a VDI environment, such as VDI environment 100, having virtual shared storage. Method 200 may be used with VDMS 150 (shown in FIG. 1) and/or VMMS 130 (shown in FIG. 1). Method 200 is embodied within a plurality of computer-executable instructions stored in one or more memories, such as one or more computer-readable storage mediums. The instructions are executed by one or more processors to perform the functions described herein.

As described in more detail herein, method 200 is executed or performed by a provisioning manager, such as provisioning manager 156 (shown in FIG. 1), for providing virtual shared storage among a cluster of hosts, tuning the virtual shared storage based on a desktop pool type, connecting the virtual shared storage to virtualization software on each host, installing one or more VMs on each host, and optimizing the cluster by benchmarking storage performance of each VM and adjusting the cluster based on the benchmark results.

Initially, a desktop pool type is received 210 by the provisioning manager. The pool type may be selected from among a list of pre-determined pool types. The pool type may also be selected by an administrator using a web interface associated with the provisioning manager. The desktop pool type may be associated with other pool-related parameters and other virtual shared storage parameters and benchmarking options, which together form a provisioning template. Such templates may be included in a recipe for complete provisioning operations.

Virtual shared storage is provisioned 220 using one or more hosts in a cluster. More specifically, the provisioning manager may transmit software and/or instructions to a storage manager in each host causing the virtual shared storage abstraction layer to be created. The virtual shared storage is configured 230 based on the desktop pool type. For example, if the pool type is non-persistent, the virtual shared storage may be configured to delay writes but acknowledge writes immediately.

The virtual shared storage is connected 240 to a virtualization manager, such as virtualization software 124, on each host in the cluster. More specifically, the virtual shared storage may include a file system, and/or a block device, e.g., a LUN. Once connected, the virtualization manager may read and write from/to the virtual shared storage. The provisioning manager may create one or more datastores within the virtual shared storage for storing virtual disk images.

The provisioning manager provisions 250, e.g., using VMMS 130, one or more VMs to each host in the cluster. The number of initial VMs provided is based on a heuristic used to estimate a number of VMs operable on each host while delivering a minimum threshold IOPS.

The provisioning manager requests 260 a storage performance benchmark from each VM by communicating with an agent running within each guest OS and instructing the agent to commence a storage performance benchmark. The benchmark is run approximately simultaneously within each VM in the cluster. The provisioning manager receives 270 benchmark results from each agent. The provisioning manager determines 280 if the benchmark results meet a minimum threshold within a pre-defined tolerance, such as +/−1, 2, 3, 4, 5, 10, 15, etc. percent. The minimum threshold may be pre-determined based on the pool type or input by a user. An average, floor, or ceiling of the benchmark results from each VM may be used to determine if the benchmark results meet, or exceed, a minimum threshold.

If the threshold is not met within the pre-defined tolerance, then the provisioning manager optimizes 290 the cluster. Optimizing 290 the cluster includes requesting 260 a storage performance benchmark test, receiving 270 benchmark test results, determining 280 if the benchmark results meet a threshold, and performing 295 an optimization on the cluster to improve the benchmark results. Optimization 290 may occur in a loop until the threshold is met, for a pre-determined time, or a pre-determined number of iterations, or until performance targets, i.e., benchmark minimum thresholds, are met within the pre-defined tolerance while maximizing the number of running VMs 105.

Performing 295 an optimization on the cluster may include resizing the pool size by increasing or decreasing the number of VMs on each host. Performing 295 an optimization on the cluster may also include changing the configuration of the storage manager 126 and/or the virtual shared storage. If the threshold is met, then method 200 is completed 297. However, the cluster may be optimized 290 at any time subsequent to the initial optimization performed when the cluster is provisioned.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A virtual desktop infrastructure system, comprising:
    a cluster of hosts each having a storage system and a storage manager; and
    a virtual desktop management server configured to manage a plurality of virtual desktops of a desktop pool type, the desktop pool type associated with one or more pool based parameters, the virtual desktop management server having a provisioning manager, said provisioning manager configured to:
        provision virtual shared storage using the storage manager of each host in said cluster of hosts including tuning configuration settings of the virtual shared storage based on the one or more pool based parameters associated with the desktop pool type, the configuration settings including each of:
            whether de-duplication is enabled in the virtual shared storage;
            whether in-line compression is enabled in the virtual shared storage;
            level of redundancy in the virtual shared storage; and
            whether write acknowledgements are issued immediately irrespective of whether the write has been committed or only after the write was committed to stable media;
        provision a plurality of virtual machines to each host in said cluster of hosts, the plurality of virtual machines configured to execute the plurality of virtual desktops of the desktop pool type;
        receive a first storage performance benchmark result from each of the virtual machines that indicates the storage performance of said each virtual machine when the virtual machine is attempting to utilize the virtual shared storage;
        determine if the first storage performance benchmark results meet a threshold that is designated for the desktop pool type; and
        execute an optimization loop to optimize the virtual shared storage by periodically (a) modifying one or more of the configuration settings of the virtual shared storage and (b) modifying an allocation of processor cores or random access memory (RAM) allocated to the storage manager of a subset of said cluster of hosts based on a determination that the first storage performance benchmark results do not meet the threshold.

2. The virtual desktop infrastructure system of claim 1, wherein the provisioning manager is further configured to:
    receive a second storage performance benchmark result from each of the virtual machines;
    determine if the second storage performance benchmark results meet the threshold; and
    modify the allocation of processor cores or random access memory (RAM) allocated to the storage manager on a second subset of said cluster of hosts based on a determination that the second storage performance benchmark results do not meet the threshold.

3. The virtual desktop infrastructure system of claim 1, further comprising: adjusting a number of virtual machines associated with each host based on a determination that the first storage performance benchmark results do not meet the threshold.

4. The virtual desktop infrastructure of claim 1, wherein said storage manager is a virtual storage appliance.

5. The virtual desktop infrastructure system of claim 1, wherein the provisioning manager is further configured to request the first storage performance benchmark result from each of the virtual machines.

6. The virtual desktop infrastructure system of claim 1, wherein the storage performance benchmark result represents at least one of a number of input/output operations per second or a measurement of latency.

7. The virtual desktop infrastructure of claim 1, wherein the desktop pool type indicates whether the plurality of virtual desktops is persistent or non-persistent; and wherein:
    if the desktop pool type is non-persistent, the provisioning manager configures the virtual shared storage to acknowledge writes immediately irrespective of whether the writes have been committed;
    otherwise, if the desktop pool type is persistent, the provisioning manager configures the virtual shared storage to acknowledge writes only after the writes have been committed.

8. The virtual desktop infrastructure of claim 1, wherein tuning configuration settings further comprises:
    disabling de-duplication in the virtual shared storage if the virtual desktops are based on a master virtual machine operating system image and each virtual desktop is associated with a respective delta file which grows over time based on copy-on-write operations;
    otherwise enabling de-duplication in the virtual shared storage system.

9. The virtual desktop infrastructure system of claim 1, wherein the storage manager is a virtual storage appliance (VSA) and wherein the provisioning manager is further configured to:
    periodically re-tether one or more of the virtual machines to be co-located on a hypervisor that hosts the VSA if dynamic resource balancing functionality causes the one or more virtual machines to become located on a different hypervisor from the hypervisor hosting the VSA.

10. At least one non-transitory computer-readable storage medium having computer-executable instructions embodied thereon, wherein, when executed by at least one processor, the computer-executable instructions cause the at least one processor to:
    determine a desktop pool type associated with a plurality of virtual desktops, the desktop pool type associated with one or more pool based parameters;
    provision virtual shared storage within a cluster of hosts including tuning configuration settings of the virtual shared storage based on the one or more pool based parameters associated with the desktop pool type, the configuration settings including each of:
whether de-duplication is enabled in the virtual shared storage;
whether in-line compression is enabled in the virtual shared storage;
level of redundancy in the virtual shared storage; and
whether write acknowledgements are issued immediately irrespective of whether the writes has been committed or only after the write was committed to stable media;
provision a plurality of virtual machines to each host in the cluster of hosts, the plurality of virtual machines configured to execute the plurality of virtual desktops of the desktop pool type;
receive a first storage performance benchmark result from each of the virtual machines that indicates the storage performance of said each virtual machine when the virtual machine is attempting to utilize the virtual shared storage;
determine if the first storage performance benchmark results meet a threshold that is designated for the desktop pool type; and
execute an optimization loop to optimize the virtual shared storage by periodically (a) modifying one or more of the configuration settings of the virtual shared storage and (b) modifying an allocation of processor cores or random access memory (RAM) allocated to the storage manager on at least one of the cluster of hosts based on a determination that the first storage performance benchmark results do not meet the threshold.

11. The at least one non-transitory computer-readable storage medium of claim 10, wherein the computer-executable instructions further cause the at least one processor to:
receive a second storage performance benchmark result from each of the virtual machines;
determine if the second storage performance benchmark results meet the threshold; and
modify the allocation of processor cores or random access memory (RAM) allocated to the storage manager on at least one of the cluster of hosts based on a determination that the second storage performance benchmark results do not meet the threshold.

12. The at least one non-transitory computer-readable storage medium of claim 10, wherein the computer-executable instructions further cause the at least one processor to connect the virtual shared storage to a virtualization software that is associated with each host in the cluster of hosts.

13. The non-transitory computer readable storage medium of claim 10, wherein tuning configuration settings further comprises:
disabling de-duplication in the virtual shared storage if the virtual desktops are based on a master virtual machine operating system image and each virtual desktop is associated with a respective delta file which grows over time based on copy-on-write operations;
otherwise enabling de-duplication in the virtual shared storage system.

14. A method of provisioning a virtual desktop infrastructure, the method comprising:
determining a desktop pool type associated with a plurality of virtual desktops, the desktop pool type associated with one or more pool-related parameters;
provisioning virtual shared storage within a cluster of hosts including tuning configuration settings of the virtual shared storage based on the one or more pool-related parameters associated with the desktop pool type, the configuration settings including each of:
whether de-duplication is enabled in the virtual shared storage;
whether in-line compression is enabled in the virtual shared storage;
level of redundancy in the virtual shared storage; and
whether write acknowledgements are issued immediately irrespective of whether the writes has been committed or only after the write was committed to stable media;
provisioning a plurality of virtual machines to each host in the cluster of hosts, the plurality of virtual machines configured to execute the plurality of virtual desktops of the desktop pool type;
receiving a first storage performance benchmark result from each of the virtual machines that indicates the storage performance of said each virtual machine when the virtual machine is attempting to utilize the virtual shared storage;
determining if the first storage performance benchmark results meet a threshold that is designated for the desktop pool type; and
execute an optimization loop to optimize the virtual shared storage by periodically (a) modifying one or more of the configuration settings of the virtual shared storage and (b) modifying an allocation of processor cores or random access memory (RAM) allocated to the storage manager on at least one of the cluster of hosts based on a determination that the first storage performance benchmark results do not meet the threshold.

15. The method of claim 14, further comprising:
receiving a second storage performance benchmark result from each of the virtual machines;
determining if the second storage performance benchmark results meet the threshold; and
modify the allocation of processor cores or random access memory (RAM) allocated to the storage manager of at least one of the cluster of hosts based on a determination that the second storage performance benchmark results do not meet the threshold.

16. The method of claim 14, further comprising requesting the first storage performance benchmark from each of the virtual machines.

17. The method of claim 14, further comprising connecting the virtual shared storage to a virtualization software that is associated with each host in the cluster of hosts.

18. The method of claim 14, wherein receiving a first storage performance benchmark result comprises receiving at least one of a number of input/output operations per second or a measurement of latency.

19. The method of claim 14 wherein the desktop pool type indicates whether the plurality of virtual desktops is persistent or non-persistent; and wherein configuring the virtual shared storage further comprises:
if the desktop pool type is non-persistent, configuring the virtual shared storage to acknowledge writes immediately irrespective of whether the writes have been committed;
otherwise, if the desktop pool type is persistent, configuring the virtual shared storage to acknowledge writes only after the writes have been committed.

20. The method of claim 14, wherein tuning configuration settings further comprises:
disabling de-duplication in the virtual shared storage if the virtual desktops are based on a master virtual machine operating system image and each virtual desktop is associated with a respective delta file which grows over time based on copy-on-write operations;

otherwise enabling de-duplication in the virtual shared storage system.

* * * * *